US009984542B2

(12) United States Patent
Ekambaram et al.

(10) Patent No.: US 9,984,542 B2
(45) Date of Patent: May 29, 2018

(54) GENERATING ALERTS BY MATCHING AUDIO SIGNATURES FROM TRUSTED SMART DEVICES (71) Applicant: International Business Machines Corporation, Armonk, NY (US)

(72) Inventors: Vijay Ekambaram, Bangalore (IN); Pratyush Kumar, Bangalore (IN); Lohit K. Namboodiri, Bangalore (IN); Ramasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/285,724

(22) Filed: Oct. 5, 2016

(65) Prior Publication Data

US 2018/0096574 A1 Apr. 5, 2018

(51) Int. Cl.
*G08B 13/20* (2006.01)
*G08B 13/16* (2006.01)
*G06F 1/16* (2006.01)

(52) U.S. Cl.
CPC .......... *G08B 13/1672* (2013.01); *G06F 1/163* (2013.01)

(58) Field of Classification Search
CPC .......................... G08B 13/1672; G06F 1/163
USPC ................ 340/544, 425.5, 539.11, 540, 628; 348/14.02, 142, 152
See application file for complete search history.

(56) References Cited

U.S. PATENT DOCUMENTS

| 7,391,315 | B2 | 6/2008 | Friar |
|---|---|---|---|
| 8,620,846 | B2 | 12/2013 | Falchuk et al. |
| 8,667,112 | B2 | 3/2014 | Roth et al. |
| 2011/0046805 | A1 | 2/2011 | Bedros et al. |

(Continued)

FOREIGN PATENT DOCUMENTS

EP 2492881 A2 8/2012

OTHER PUBLICATIONS

Karapanos, Sound-proof: usable two-factor authentication based on ambient sound, SEC 2015 Proceedings of the 24th USENIX Conference on Security Symposium.

(Continued)

*Primary Examiner* — Dhaval Patel
(74) *Attorney, Agent, or Firm* — Ryan, Mason & Lewis, LLP (57) ABSTRACT

Methods, systems, and computer program products for generating alerts by matching audio signatures from trusted smart devices are provided herein. A computer-implemented method includes converting one or more captured audio signals originating from a given area of a given environment to one or more audio signatures, wherein the one or more audio signatures correspond to one or more pre-defined user actions within the given environment; comparing the one or more audio signatures to one or more audio signatures associated with one or more user devices authorized to access the given area of the given environment; generating, based on said comparing, an alert upon a determination that the audio signatures do not exceed a threshold level of similarity with respect to the audio signatures associated with the one or more user devices authorized to access the given area; and outputting the alert to one or more of the user devices authorized to access the given area of the given environment.

20 Claims, 7 Drawing Sheets

(56) References Cited

U.S. PATENT DOCUMENTS

| | | | |
|---|---|---|---|
| 2014/0111336 A1* | 4/2014 | Lee ................... | G08B 13/1672 340/540 |
| 2015/0112885 A1 | 4/2015 | Fadell et al. | |
| 2015/0156031 A1 | 6/2015 | Fadell et al. | |
| 2015/0207915 A1* | 7/2015 | Roberts ................ | G08B 21/182 340/539.11 |
| 2015/0287310 A1* | 10/2015 | Deliuliis ................ | G08B 21/10 340/628 |

OTHER PUBLICATIONS

Ozhiganov, I., NFC Alternative: Transferring Data Between Mobile Devices Using Ultrasound. Azoft, http://rnd.azoft.com/mobile-app-transering-data-using-ultrasound/, Oct. 9, 2013.

Wisneski, C., Ultrasonic Local Area Communication, http://alumni.media.mit.edu/~wiz/ultracom.html, 1998.

Dickson, B.W., Wireless Communication Options for a Mobile Ultrasound System. Worcester Polytechnic Institute, https://www.wpi.edu/Pubs/ETD/Available/etd-090208-162440/unrestricted/bdickson.pdf. Aug. 2008.

* cited by examiner

GENERATING ALERTS BY MATCHING AUDIO SIGNATURES FROM TRUSTED SMART DEVICES

FIELD

The present application generally relates to information technology, and, more particularly, to audio signature matching techniques.

BACKGROUND

An increasing number of homes and buildings are being built and/or reconfigured as "smart" homes and buildings. As used herein, a "smart home," for example, refers to a residential location where networked devices automate the control of various functions (heating, lighting, security, etc.). Commonly, security serves as a primary motivation for such building and/or reconfiguration decisions. However, existing smart home/building technologies fall to effectively detect intrusions into smart homes/buildings, and also fail to effectively detect potentially hazardous events and/or accident scenarios.

SUMMARY

In one embodiment of the present invention, techniques for generating alerts by matching audio signatures from trusted smart devices are provided. An exemplary computer-implemented method can include converting one or more captured audio signals originating from a given area of a given environment to one or more audio signatures, wherein the one or more audio signatures correspond to one or more pre-defined user actions within the given environment. Such a method can also include comparing the one or more audio signatures to one or more audio signatures associated with one or more user devices authorized to access the given area of the given environment, and generating, based on the comparing, an alert upon a determination that the audio signatures do not exceed a threshold level of similarity with respect to the audio signatures associated with the one or more user devices authorized to access the given area. Further, such a method can include outputting the alert to one or more of the user devices authorized to access the given area of the given environment.

In another embodiment of the invention, an exemplary computer-implemented method can include detecting an event within a given area of a given environment, wherein detecting is based on one or more audio signals originating from the given area, and determining a periodicity requirement of human presence in the given area in response to the detected event, wherein determining the periodicity requirement comprises comparing the detected event to a collection of information pertaining to periodicity requirements of human presence in relation to multiple detected events. Such a method can also include generating an instruction to emit one or more signals in the given area of the given environment during a defined temporal period, wherein the defined temporal period is based on the determined periodicity requirement of human presence. Also, such a method can include determining the presence, within the given area, of one or more user devices authorized to access the given area of the given environment during the defined temporal period, wherein determining the user device presence comprises monitoring interaction between the one or more emitted signals and the one or more user devices. Further, such a method can include generating, based on determining the user device presence, an alert upon a determination that none of the authorized user devices interacted with the one or more emitted signals during the defined temporal period, and outputting the alert to one or more of the user devices authorized to access the given area of the given environment.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes generating on-demand alerts by matching audio signatures from trusted smart devices in a given environment (such as, for example, a smart home). At least one embodiment of the invention includes leveraging smart microphone devices (such as, for example, smart assistants) in an environment (such as a smart home) to detect one or more types of events. One or more such embodiments can include detecting intrusions in a smart environment by comparing audio signatures collected from one or more areas of the environment (for example, rooms of a smart home) and received audio sounds captured via one or more authorized wearable devices (such as a smart watch, for example) of one or more users.

Additionally, one or more embodiments of the invention can include detecting potentially hazardous scenarios (thereby potentially preventing accidents) in a smart environment by emitting ultra-sound signals from an area within the smart environment (a room in a smart home, for example) when an audio signature of an event (switching on toaster, for instance) is recorded. Further, such an embodiment includes checking for the presence of a user within a given proximity of the environment area based on a periodicity of an event associated with the emitted ultra-sound signal, as received by an authorized wearable devices of the user.

Figure 1:
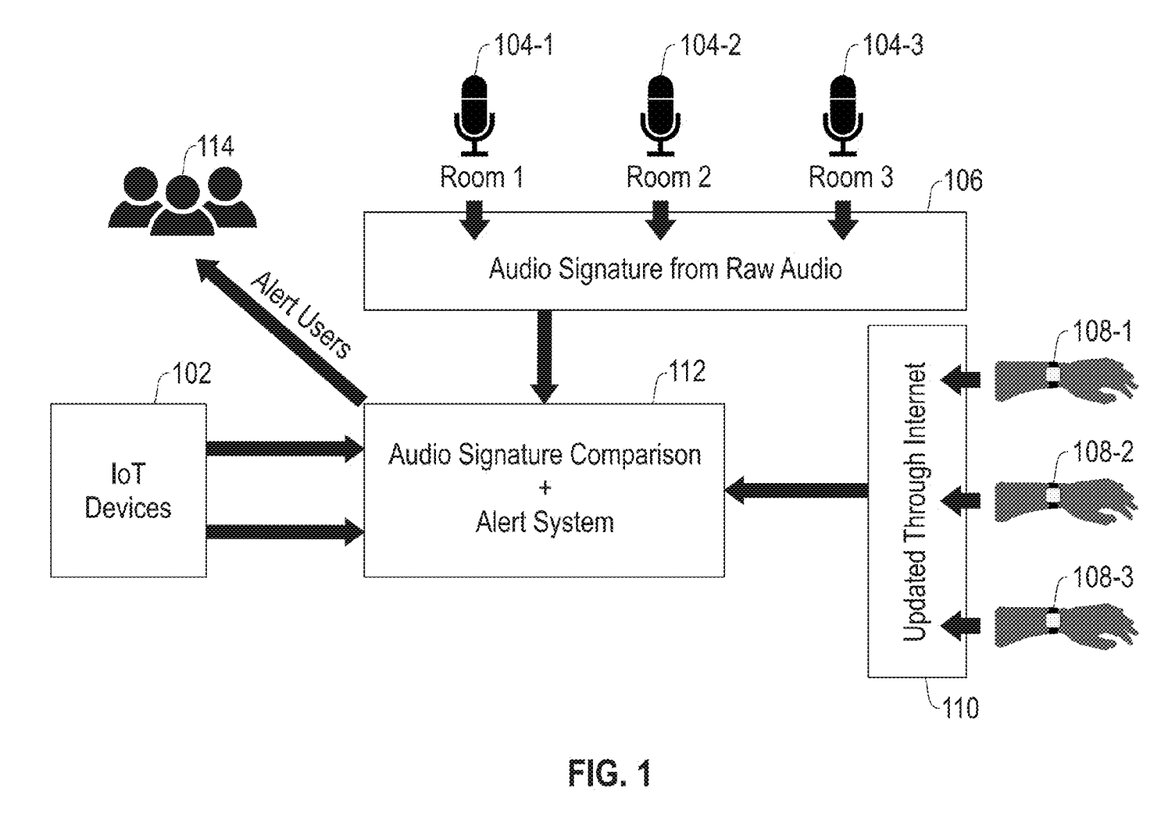
FIG. 1 is a diagram illustrating system architecture, according to an exemplary embodiment of the invention.

FIG. 1 is a diagram illustrating system architecture, according to an embodiment of the invention. By way of illustration, FIG. 1 depicts intrusion detection in a smart environment through audio-signature comparison at runtime. Specifically, FIG. 1 depicts Internet of things (IoT) devices 102 (such as a smart toaster, a smart refrigerator, etc.), smart microphones (M) 104-1, 104-2 and 104-3 (which are located in room 1, room 2 and room 3, respectively, of a smart home), smart wearable devices (R) 108-1, 108-2 and 108-3 (which can be word by one or more users associated with the smart home), and an audio signature comparison and alert system 112.

As also illustrated in FIG. 1, audio signatures 106 from raw audio captured by smart microphone 104-1, 104-2 and/or 104-3 (collectively referred to herein as microphones 104) are provided to the audio signature comparison and alert system 112. Additionally, audio data 110 captured via smart wearable device 108-1, 108-2 and/or 108-3 (collectively referred to herein as smart wearable devices 108) can be updated through the Internet and provided to system 112. Similarly, IoT devices 102 can also provide audio data to system 112. IoT devices 102 can include a broad set of devices, such as devices which include high bandwidth network connectivity and audio capture hardware. System 112, based on the provided inputs, compares the audio signatures collected from the microphones 104 (as well as data provided by the IoT devices 102) and the audio data captured by the smart wearable devices 108 to determine a degree of similarity therebetween. Based on the determined degree of similarity, system 112 can subsequently generate and output an alert to users 114 associated with the smart home, wherein the alert indicates a possible intrusion in one of the rooms of the smart home.

Figure 2:
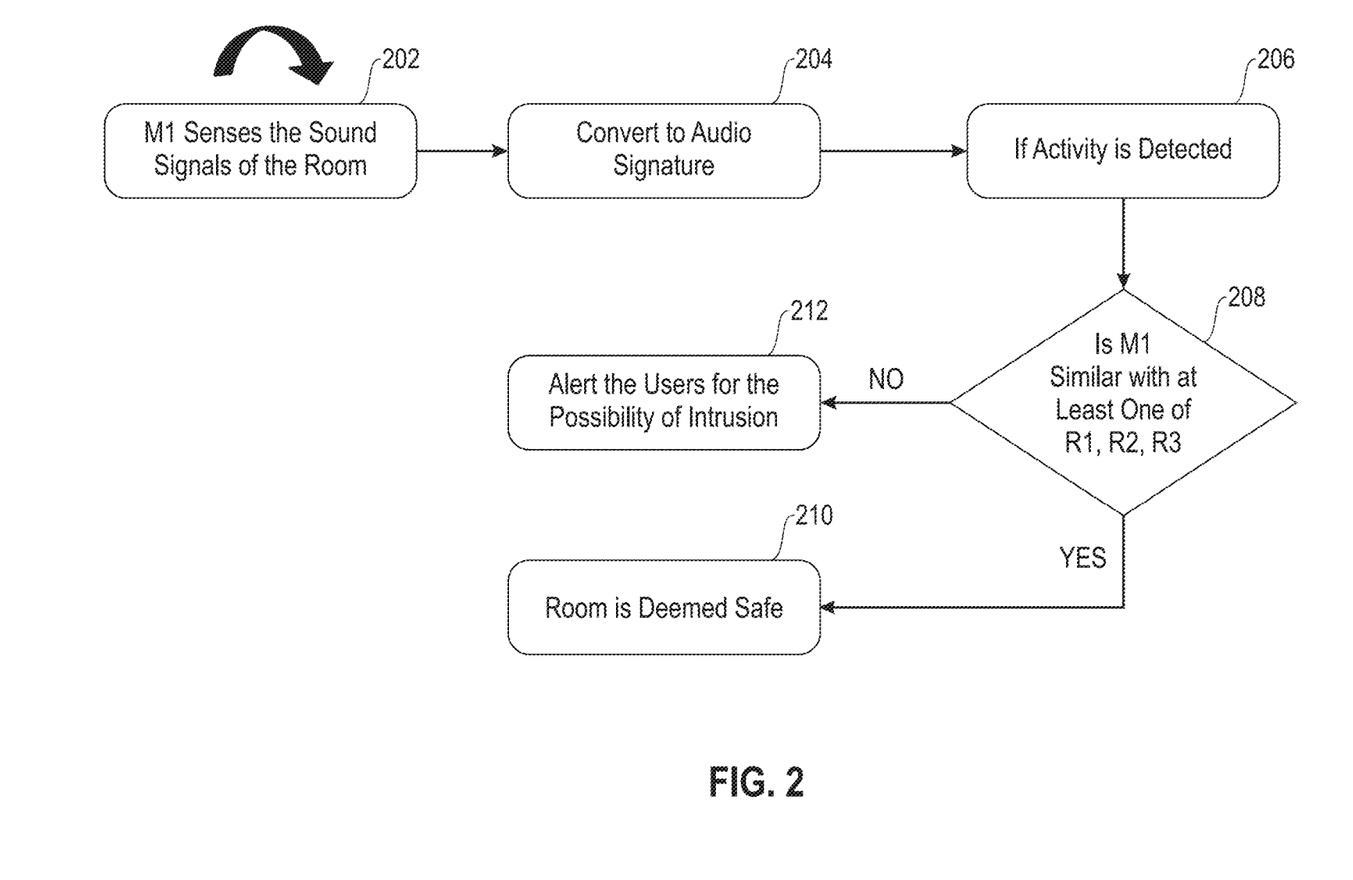
FIG. 2 is a flow diagram illustrating techniques according to an embodiment of the invention.

FIG. 2 is a flow diagram illustrating techniques according to an embodiment of the present invention. Step 202 includes a smart microphone (M1) continuously sensing the sound signals of a room within a smart home. In at least one embodiment of the invention, every room in the smart home can include a smart microphone. Additionally, in one or more embodiments of the invention, one or more users associated with the smart home (residents of the home, for example) can be equipped with a smart wearable device (a smart watch, for example) which is registered with one or more of the rooms in the smart home that are accessible to the user. Also, a smart wearable device of a guest in the smart home can become authorized by a near-field communication (NFC) tap on a smart device at the home. Accordingly, such wearable devices can monitor the audio signals of the surrounding rooms.

Step 204 includes converting the captured audio signals to audio signatures. In one or more embodiments of the invention, converting a raw audio signal into an audio signature includes extracting one or more useful features from the raw sound signal which correspond to some pre-defined event triggered by a user and/or one or more pre-defined user actions. Examples of audio signatures can include a "door opening" sound, a "door closing" sound, an alarm sound, a "lock opening" sound, etc.

Step 206 includes determining that an activity is detected in the captured audio signals, as evidenced by the audio signatures. Step 208 includes comparing the audio signatures generated by the microphone (M1) with the signatures received by the authorized user (wearable) devices (R1, R2 and R3) to determine the level of similarity therebetween. The user devices can include, for example, smart watches. By way of illustration, if an audio signature is identified by a microphone in Room X, then at least one embodiment of the invention includes checking as to whether the same audio signature was recorded in at least one smart watch registered with Room X.

Step 210 includes determining that a room is to be deemed safe upon a determination that an audio signature identified by the microphone in Room X matches an audio signature recorded in at least one smart watch registered with Room X. Alternatively, step 212 includes raising an alert if a sound signature identified by the microphone in Room X indicates a given activity, and this audio signature is not similar to a signature recorded by any of the authorized devices. Such an alert can indicate the possibility of an intrusion (in Room X), and can be output to the smart watch of one or more users registered with Room X.

Figure 3:
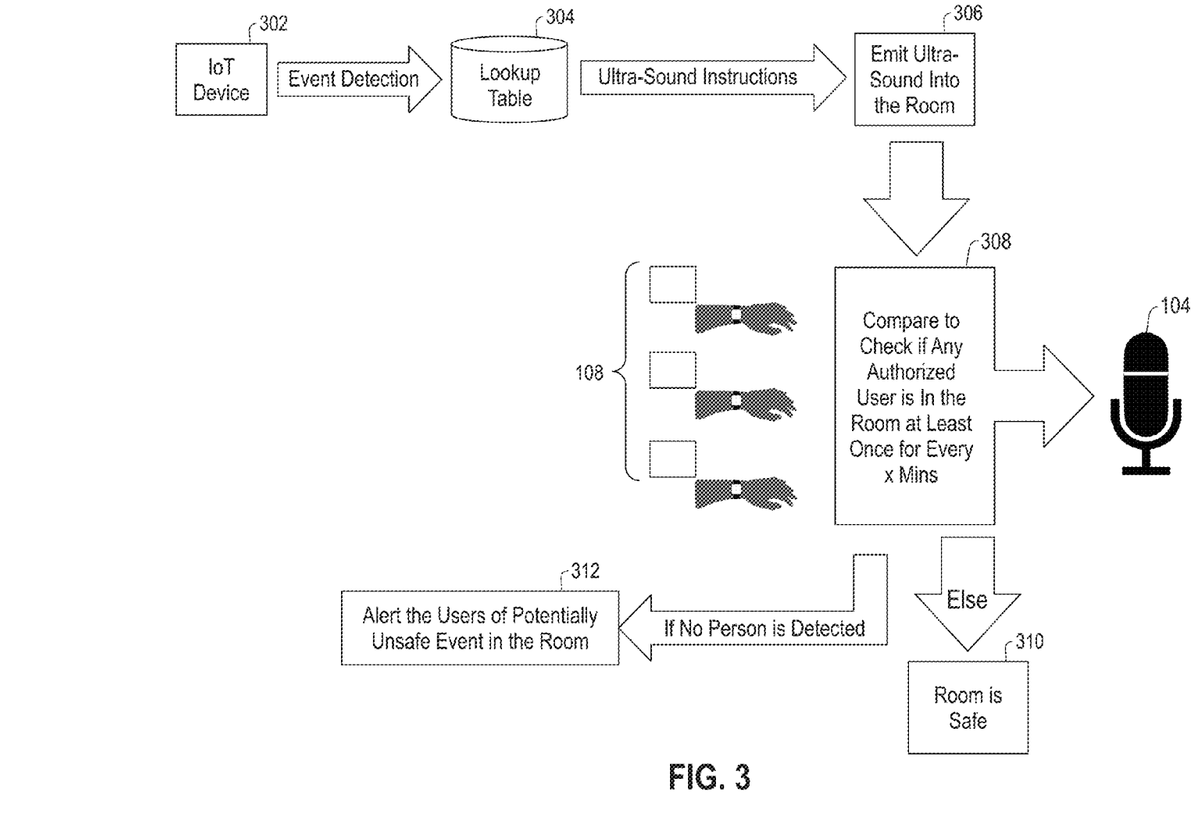
FIG. 3 is a diagram illustrating system architecture, according to an exemplary embodiment of the invention.

FIG. 3 is a diagram illustrating system architecture, according to an embodiment of the invention. By way of illustration, FIG. 3 depicts audio signature comparison to identify unsafe events in a smart home. Specifically, FIG. 3 depicts detecting one or more events in connection with an IoT device 302. For example, a smart microphone can capture a sound from a room within the smart home, wherein such a sound indicates the start of an event (such as, for instance, switching on a toaster). Such an event can be derived, for example, via a human voice command (in connection with the IoT device 102), and/or provided directly by the IoT device 102.

As also depicted in FIG. 3, at least one embodiment of the invention includes maintaining and/or loading a presence mandate lookup table 304, which can be user-configured. Such a table 304 includes information pertaining to the periodicity of human presence when a given audio signature is recorded. For example, if "switching on the stove" is an audio signature which is identified for Room X, then the table 304 might indicated that there has to be a human presence in Room X at least one every 20 minutes subsequent to the detection of that audio signature. Accordingly, in at least one embodiment of the invention, if a microphone in a room of the smart home detects an event, the presence mandate table 304 is queried to determine the related periodicity information and ultra-sound instructions. It is noted that, by way of example, ultra-sound signals are utilized in one or more embodiments of the invention because such signals enable communication between devices without affecting human-perceived audio.

Additionally, as illustrated in FIG. 3, such an embodiment includes emitting an ultra-sound signal 306 (that is, a human-inaudible sound which can be detected by one or more devices) into the room associated with the detected event. In at least one embodiment of the invention, each room in the smart home is equipped with a device (such as a speaker) which can emit an ultra-sound signal continuously or in periodic intervals (as designated per the above-noted instructions). Additionally, in one or more embodiments of the invention, the instruction to generate an ultra-sound signal is decentralized. By way of illustration, such an embodiment can include programming an IoT device in a house to individually send an ultrasound instruction periodically, without any centralized control.

As also depicted in FIG. 3, one or more embodiments of the invention can include smart wearable devices 108 storing the ultra-sound signals emitted in surrounding areas (of the given wearable device). Further, presence detection component 308 analyzes the ultra-sound signals captured by the wearable devices 108 to determine if any authorized user is present in Room X at least once during every designated temporal period corresponding to the detected event in Room X. For example, a centralized server of the smart home can query one or more (all, for example) of the smart watches registered to access Room X to determine whether the emitted ultra-sound signal was recorded by at least one of the smart watches during every designated temporal period (for example, every $t_1$ seconds).

If a registered device (and, accordingly, an authorized user) is detected in Room X at least once during every designated temporal period corresponding to the detected event in Room X, then the emission of ultra-sound signals is stopped, and Room X is deemed safe in step 310. If a registered device is not detected in Room X at least once during every designated temporal period corresponding to the detected event in Room X, then an alert is generated and output to one or more authorized users in step 312. The alert indicates a potentially unsafe event in Room X, and can also include various criticality levels, as stored in the presence mandate table 304.

Figure 4:
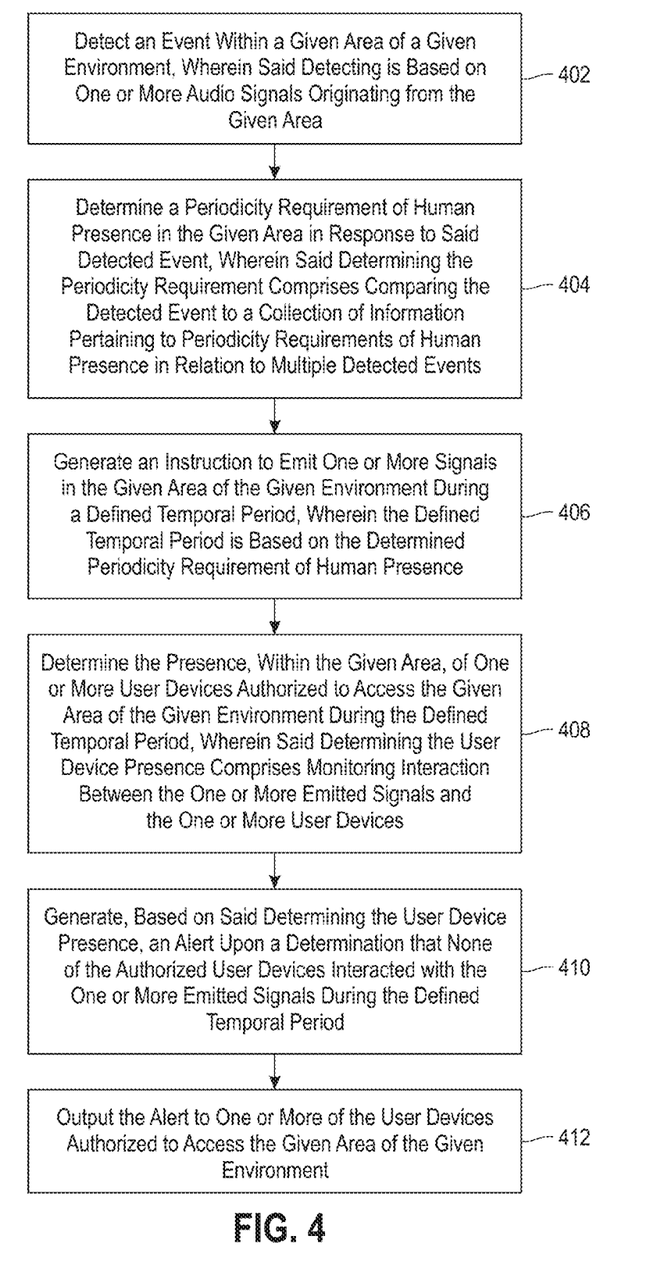
FIG. 4 is a flow diagram illustrating techniques according to an embodiment of the invention.

FIG. 4 is a flow diagram illustrating techniques according to an embodiment of the present invention. Step 402 includes detecting an event within a given area of a given environment, wherein said detecting is based on one or more audio signals originating from the given area. The audio signals originating from the given area can include one or more audio signals generated by an appliance within the given area, as well as one or more human voice commands related to an appliance within the given area.

Step 404 includes determining a periodicity requirement of human presence in the given area in response to said detected event, wherein said determining the periodicity requirement comprises comparing the detected event to a collection of information pertaining to periodicity requirements of human presence in relation to multiple detected events.

Step 406 includes generating an instruction to emit one or more signals in the given area of the given environment during a defined temporal period, wherein the defined temporal period is based on the determined periodicity requirement of human presence. The one or more emitted signals can include one or more ultra-sound signals.

Step 408 includes determining the presence, within the given area, of one or more user devices authorized to access the given area of the given environment during the defined temporal period, wherein said determining the user device presence comprises monitoring interaction between the one or more emitted signals and the one or more user devices. The user devices can include one or more wearable devices such as, for example, smart watches.

Step 410 includes generating, based on said determining the user device presence, an alert upon a determination that none of the authorized user devices interacted with the one or more emitted signals during the defined temporal period. Such a generated step can include generating an instruction to continuously emit one or more signals in the given area, and can also include generating an instruction to periodically emit one or more signals in the given area. Additionally, the alert can include one of multiple criticality levels attributed to the detected event, wherein the criticality level is derived from the collection of information pertaining to periodicity requirements of human presence in relation to multiple detected events. Also, step 412 includes outputting the alert to one or more of the user devices authorized to access the given area of the given environment.

At least one embodiment of the invention (such as the techniques depicted in FIG. 2 and FIG. 4, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives audio data and/or event detection information sent from a data source to the transmission server. The server can process the information, for example, based upon user-provided user preference information that is stored in memory on the server. Subsequently, an alert is generated containing potential intrusion and/or potential unsafe event information. The alert can be formatted into data blocks, for example, based upon any provided alert format preference information. Subsequently, the alert and/ or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
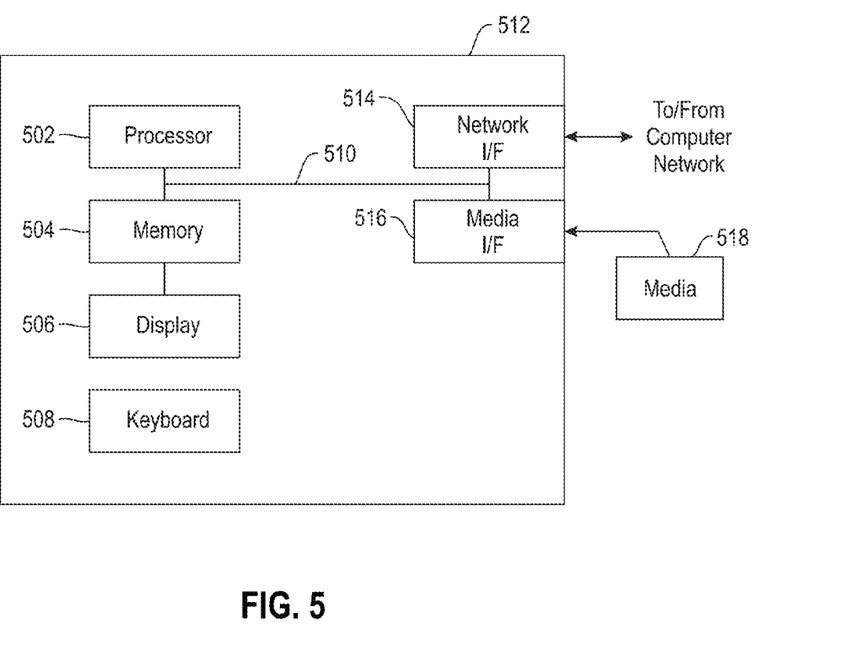
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
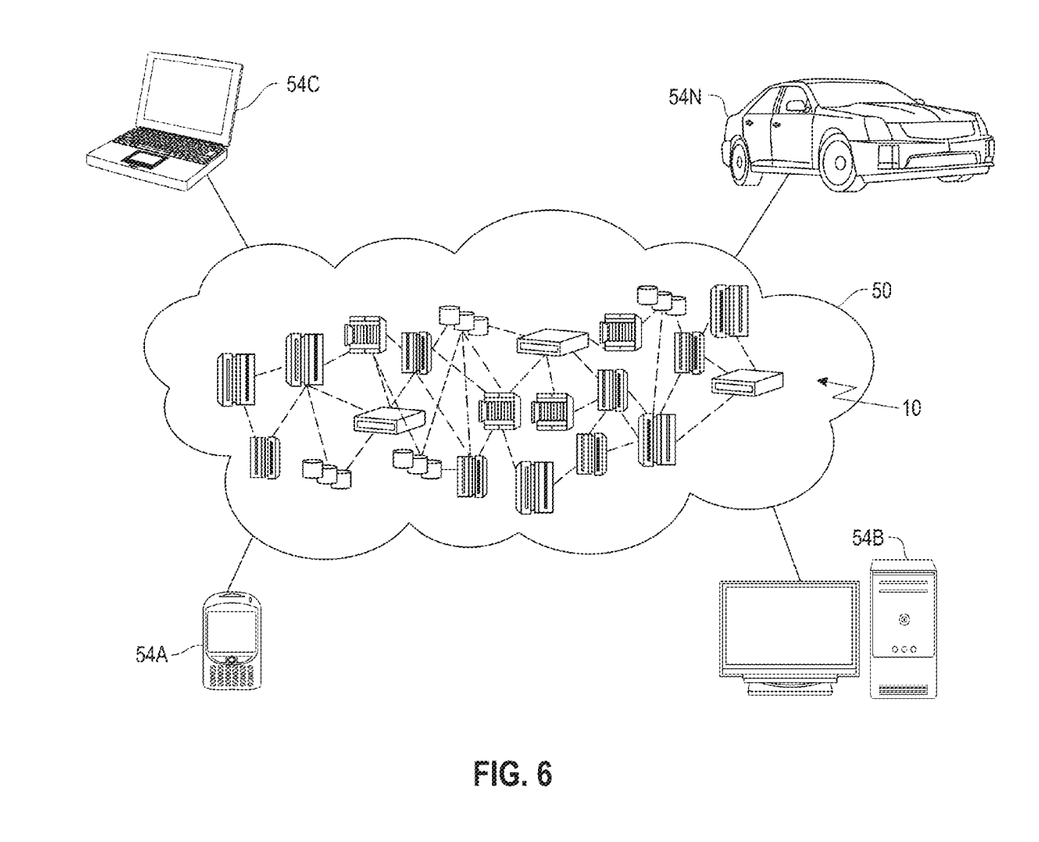
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
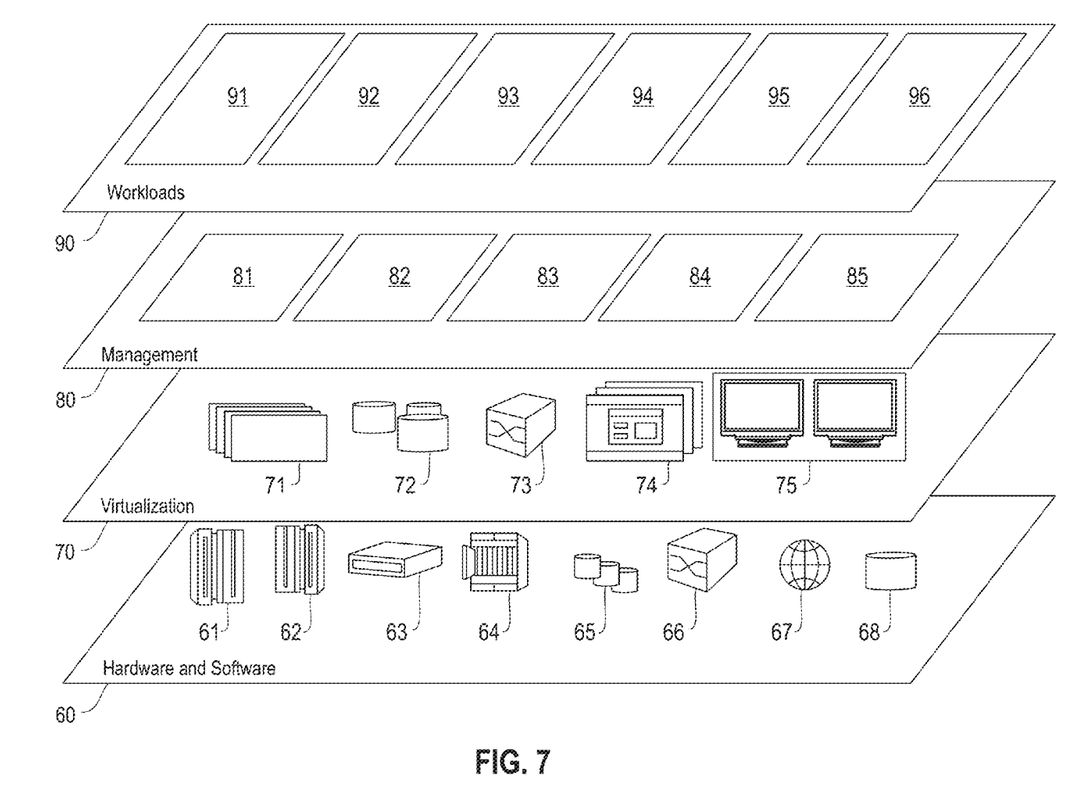
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intrusion detection and accident prevention 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, alerting a user when a potentially unsafe event is detected in a smart home by comparing audio signatures generated from a room with audio signatures captured by a user's wearable device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   converting one or more captured audio signals originating from a given area of a given environment to one or more audio signatures, wherein the one or more audio signatures correspond to one or more pre-defined user actions within the given environment;
   comparing the one or more audio signatures to one or more audio signatures associated with one or more user devices authorized to access the given area of the given environment, wherein the one or more user devices authorized to access the given area of the given environment comprise one or more devices (i) attributed to one or more users associated with the given environment and (ii) registered with one or more of the given areas accessible to the one or more users associated with the given environment;
   generating, based on said comparing, an alert upon a determination that the audio signatures do not exceed a threshold level of similarity with respect to the audio signatures associated with the one or more user devices authorized to access the given area; and
   outputting the alert to one or more of the user devices authorized to access the given area of the given environment;
   wherein the steps are carried out by at least one computing device.

2. The computer-implemented method of claim 1, wherein the given environment comprises a smart home.

3. The computer-implemented method of claim 2, wherein the given area comprises a room within the smart home.

4. The computer-implemented method of claim 1, wherein said converting comprises extracting one or more features from the captured audio signals, wherein the one or more features relate to the one or more pre-defined user actions.

5. The computer-implemented method of claim 1, wherein the one or more user devices comprise one or more wearable devices.

6. The computer-implemented method of claim 5, wherein the one or more wearable devices comprises one or more smart watches.

7. The computer-implemented method of claim 1, wherein the alert comprises an indication of a possible intrusion in the given area of the given environment.

8. The computer-implemented method of claim 1, comprising:
   monitoring audio signals originating from the given area via one or more microphones.

9. A computer program product comprising a computer readable storage medium having program instructions embodied therewith, the program instructions executable by a device to cause the device to:
   convert one or more captured audio signals originating from a given area of a given environment to one or more audio signatures, wherein the one or more audio signatures correspond to one or more pre-defined user actions within the given environment;
   compare the one or more audio signatures to one or more audio signatures associated with one or more user devices authorized to access the given area of the given environment, wherein the one or more user devices authorized to access the given area of the given environment comprise one or more devices (i) attributed to one or more users associated with the given environment and (ii) registered with one or more of the given areas accessible to the one or more users associated with the given environment;
   generate, based on said comparing, an alert upon a determination that the audio signatures do not exceed a threshold level of similarity with respect to the audio signatures associated with the one or more user devices authorized to access the given area; and
   output the alert to one or more of the user devices authorized to access the given area of the given environment.

10. The computer program product of claim 9, wherein the program instructions executable further cause the device to:
    monitor audio signals originating from the given area via one or more microphones.

11. A system comprising:
    a memory; and
    at least one processor coupled to the memory and configured for:
      converting one or more captured audio signals originating from a given area of a given environment to one or more audio signatures, wherein the one or more audio signatures correspond to one or more pre-defined user actions within the given environment;
      comparing the one or more audio signatures to one or more audio signatures associated with one or more user devices authorized to access the given area of the given environment, wherein the one or more user devices authorized to access the given area of the given environment comprise one or more devices (i) attributed to one or more users associated with the given environment and (ii) registered with one or more of the given areas accessible to the one or more users associated with the given environment;
      generating, based on said comparing, an alert upon a determination that the audio signatures do not exceed a threshold level of similarity with respect to the audio signatures associated with the one or more user devices authorized to access the given area; and
      outputting the alert to one or more of the user devices authorized to access the given area of the given environment.

12. A computer-implemented method, comprising:
    detecting an event within a given area of a given environment, wherein said detecting is based on one or more audio signals originating from the given area;
    determining a periodicity requirement of human presence in the given area in response to said detected event, wherein said determining the periodicity requirement comprises comparing the detected event to a collection of information pertaining to periodicity requirements of human presence in relation to multiple detected events;

generating an instruction to emit one or more signals in the given area of the given environment during a defined temporal period, wherein the defined temporal period is based on the determined periodicity requirement of human presence;

determining the presence, within the given area, of one or more user devices authorized to access the given area of the given environment during the defined temporal period, wherein said determining the user device presence comprises monitoring interaction between the one or more emitted signals and the one or more user devices;

generating, based on said determining the user device presence, an alert upon a determination that none of the authorized user devices interacted with the one or more emitted signals during the defined temporal period; and outputting the alert to one or more of the user devices authorized to access the given area of the given environment;

wherein the steps are carried out by at least one computing device.

13. The computer-implemented method of claim 12, wherein the one or more user devices comprise one or more wearable devices.

14. The computer-implemented method of claim 12, wherein said one or more audio signals originating from the given area comprise one or more audio signals generated by an appliance within the given area.

15. The computer-implemented method of claim 12, wherein said one or more audio signals originating from the given area comprise one or more human voice commands related to an appliance within the given area.

16. The computer-implemented method of claim 12, wherein said generating comprises generating an instruction to continuously emit one or more signals in the given area.

17. The computer-implemented method of claim 12, wherein said generating comprises generating an instruction to periodically emit one or more signals in the given area.

18. The computer-implemented method of claim 12, wherein the one or more emitted signals comprise one or more ultra-sound signals.

19. The computer-implemented method of claim 12, wherein the alert comprises one of multiple criticality levels attributed to the detected event, wherein the criticality level is derived from the collection of information pertaining to periodicity requirements of human presence in relation to multiple detected events.

20. A computer program product comprising a computer readable storage medium having program instructions embodied therewith, the program instructions executable by a device to cause the device to:

detect an event within a given area of a given environment, wherein said detecting is based on one or more audio signals originating from the given area;

determine a periodicity requirement of human presence in the given area in response to said detected event, wherein said determining the periodicity requirement comprises comparing the detected event to a collection of information pertaining to periodicity requirements of human presence in relation to multiple detected events;

generate an instruction to emit one or more signals in the given area of the given environment during a defined temporal period, wherein the defined temporal period is based on the determined periodicity requirement of human presence;

determine the presence, within the given area, of one or more user devices authorized to access the given area of the given environment during the defined temporal period, wherein said determining the user device presence comprises monitoring interaction between the one or more emitted signals and the one or more user devices;

generate, based on said determining the user device presence, an alert upon a determination that none of the authorized user devices interacted with the one or more emitted signals during the defined temporal period; and output the alert to one or more of the user devices authorized to access the given area of the given environment.

\* \* \* \* \*